(12) United States Patent
Campbell

(10) Patent No.: US 6,474,191 B1
(45) Date of Patent: Nov. 5, 2002

(54) ELECTRONIC ACCELERATOR PEDAL HAVING A KICKDOWN FEATURE

(75) Inventor: Andrew Campbell, Glasgow (GB)

(73) Assignee: CTS Corporation, Elkhart, IN (US)

( * ) Notice: Subject to any disclaimer, the term of this patent is extended or adjusted under 35 U.S.C. 154(b) by 4 days.

(21) Appl. No.: 09/677,311

(22) Filed: Sep. 29, 2000

(30) Foreign Application Priority Data

Nov. 4, 1999 (EP) ............................................. 99308782

(51) Int. Cl.[7] ................................................ G05G 1/14
(52) U.S. Cl. ........................................ 74/514; 74/512
(58) Field of Search .......................... 74/512, 513, 514, 74/560

(56) References Cited

U.S. PATENT DOCUMENTS

| | | | | |
|---|---|---|---|---|
| 4,505,151 A | * | 3/1985 | Sauerschell et al. | 73/116 |
| 5,385,068 A | * | 1/1995 | White et al. | 74/512 |
| 5,416,295 A | | 5/1995 | White | 200/86.5 |
| 5,697,260 A | * | 12/1997 | Rixon et al. | 74/514 |
| 5,768,946 A | | 6/1998 | Fromer | 74/514 |
| 6,209,418 B1 | * | 4/2001 | Kalsi et al. | 74/513 |
| 6,220,222 B1 | * | 4/2001 | Kalsi | 123/399 |
| 6,305,240 B1 | * | 10/2001 | Hannewald | 74/513 |

FOREIGN PATENT DOCUMENTS

| | | | |
|---|---|---|---|
| DE | 4407005 C1 | * 9/1997 | B60K/26/02 |
| EP | 0748713 A2 | 12/1996 | |
| EP | 0670235 B1 | 8/1997 | |
| EP | 0926581 A2 | 6/1999 | |

* cited by examiner

*Primary Examiner*—Chong H. Kim
*Assistant Examiner*—Justin Stefanon
(74) *Attorney, Agent, or Firm*—Mark P. Bourgeois

(57) ABSTRACT

An electronic pedal mechanism for a vehicle includes a housing that has a shaft located within and a pedal bar that is attached to the shaft. The shaft rotates when the operator applies a force on the pedal bar. A resistance mechanism is attached to the shaft to provide a resistance against the force applied by the operator on the pedal bar. A kickdown mechanism is attached to the shaft to provide a tactile feedback to the operator that the pedal bar is at a maximum point of depression. A spring mechanism is attached to the shaft to return the pedal bar to an original position after the operator removes the force applied to the pedal bar. A sensor mechanism is attached to the shaft to generate an electrical signal in response to the rotation of the shaft. The electrical signal changes as a function of the position of the pedal bar. The electrical signal is used to control engine speed in a motor vehicle.

5 Claims, 4 Drawing Sheets

ELECTRONIC ACCELERATOR PEDAL HAVING A KICKDOWN FEATURE

BACKGROUND OF THE INVENTION

1. Field of the Invention

This invention pertains generally to vehicle pedals and more specifically to pedal structures cooperatively mated with electrical devices such as position sensors.

2. Description of the Related Art

Typical vehicle pedal cases are mechanical, typically incorporating a cable or various gears and other transmission devices to convert the limited rotary motion available from the pedal into useful mechanical motion. Other pedals incorporate some type of position sensor that converts the mechanical position into an electrical signal. In the field of automobiles and trucks, a mechanical bracket using a cable, often referred to as a Bowden cable, is the standard method for controlling the throttle of internal combustion engines. These pedal assemblies have a desirable feel and functionality and, with a few refinements, are extremely reliable. This type of pedal assembly defines the mechanical standard today.

As noted, through time there have been a number of attempts at different types of pedal devices to control machines. One major attempt has been to introduce an electrical linkage between the pedal and the device to be controlled. An electrical linkage is desirable since gear assemblies are bulky, expensive and limited due to their inherent size to those applications where the pedal is very close to the controlled device. Gear and other mechanical linkages are also prone to sticking or binding. While the Bowden cables has proved generally reliable, the penetration of moisture and other contaminants may still cause the cable to bind or freeze up during inclement weather.

A potentiometer is often used to sense the position of the accelerator pedal. This potentiometer is in some ways similar to the volume controls used in radio and television receivers. A voltage is applied across two extreme ends of a resistor. An intermediate tap is provided between the two extremes of the resistor. The tap is mechanically linked to the device which is to be sensed, and the position of the device is determined by the voltage at the intermediate tap.

There are several stringent requirements placed upon a pedal position sensor that make it different from a volume control. Since the pedal is used to measure a demand for power, binding of the pedal shaft in a position demanding power could result in life threatening situations. Safety and reliability are essential in automotive pedal applications.

The automotive environmental requirements are also different from a radio or television receiver. The pedal position sensor must reside in a dirty environment with widely varying temperatures. An operator may often bring large amounts of dirt or mud into the pedal region. Temperatures might, for example, range from −55 to +150 degrees Celsius. Further, the device may be exposed to a number of solvents and other adverse conditions associated with automotive environments. These requirements diverge greatly from the typical volume control.

In the prior art, levers or special mechanical drives were used to interface the electrical position sensor to the pedal. These drives ensured that, even in the event of some sensor malfunction, the pedal sensor would not retain the pedal in an acceleration position, but instead would allow the pedal to return to an idle stop. Engagement between the sensor and the pedal shaft then necessitated the use of a return spring so that as the pedal shaft returned to idle position, the pedal position sensor would also follow and track the position of the pedal.

The pedal position sensor in the prior art typically has been a freestanding, rather self-contained device. In addition to the return spring, a well-sealed package including the associated bearings is typically provided. Significant effort was directed at designing a package that was sealed against the adverse chemicals, dirt and moisture that might otherwise damage the sensor.

Variations in contact pressure, contact orientation, lube and other similar factors all impact the performance of the sensor. Further, field replacement is important for service repair, and the service replacement should be of the same quality as the original device. Failure to fully and completely package the sensor results in loss of precise control over lube thickness and composition, lost protection of vital components while shelved awaiting installation and during installation, and lost control over contactor and element relationships that are all desirable features.

Attempts at incorporating electrical sensors into pedals have had poor tactile feel for the operator. The pedal is no longer attached to any mechanical assembly like a cable that provides friction and resistance to overcome during operation. Since operators have become accustomed to the feel of a mechanical pedal, it is desirable to continue this feeling with electronic pedals.

With electronics becoming more prevalent and reliable than the mechanical counterparts, the ability to sense various engine functions and also in some instances non-engine or indirect engine functions is most desirable. The present invention seeks to overcome the limitations of the prior art and offer a pedal and position sensor that delivers unmatched performance without compromise and with outstanding value to cost ratio and with outstanding ergonomics for the pedal operator.

3. Related Art

Examples of patents that are related to the present invention are as follows, and each patent is herein incorporated by reference for the supporting teachings:

U.S. Pat. No. 5,768,946 is a pedal with integrated position sensor.

U.S. Pat. No. 5,416,295 is a combined pedal force switch and position sensor.

EPO patent publication no. EP 926581 A2 is an accelerator pedal installation.

EPO patent publication no. EP 748713 A2 is an accelerator pedal installation.

EPO patent publication no. EP 670235 A1 is an accelerator pedal installation.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, the applicants claimed invention.

SUMMARY OF THE INVENTION

It is a feature of the invention to provide a reliable and cost-effective electronic accelerator pedal for motor vehicles.

An additional feature of the invention is to provide an electronic pedal mechanism for a vehicle. The vehicle is operated by an operator. The pedal mechanism includes a housing that has a shaft located within and a pedal bar that is attached to the shaft. The shaft rotates when the operator applies a force on the pedal bar. A resistance mechanism is attached to the shaft to provide a resistance against the force applied by the operator on the pedal bar. A kickdown mechanism is attached to the shaft to provide a tactile feedback to the operator that the pedal bar is at a maximum point of depression. A spring mechanism is attached to the shaft to return the pedal bar to an original position after the operator removes the force applied to the pedal bar. A sensor mechanism is attached to the shaft to generate an electrical signal in response to the rotation of the shaft. The electrical signal changes as a function of the position of the pedal bar. The electrical signal is used to control engine speed in a motor vehicle.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
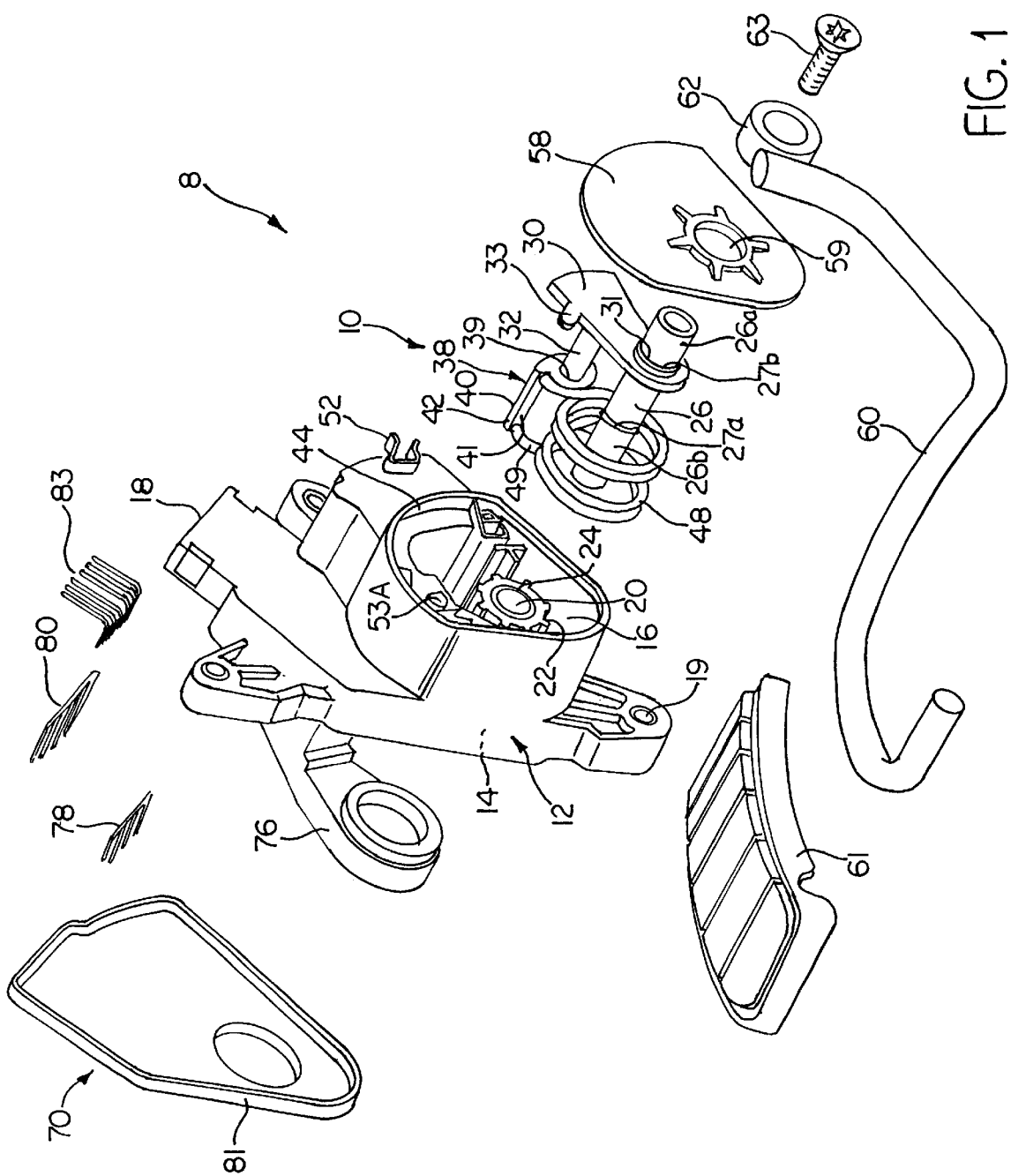
FIG. 1 is an exploded spring side perspective view of the preferred embodiment of an electronic accelerator pedal.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENTS

Figure 2:
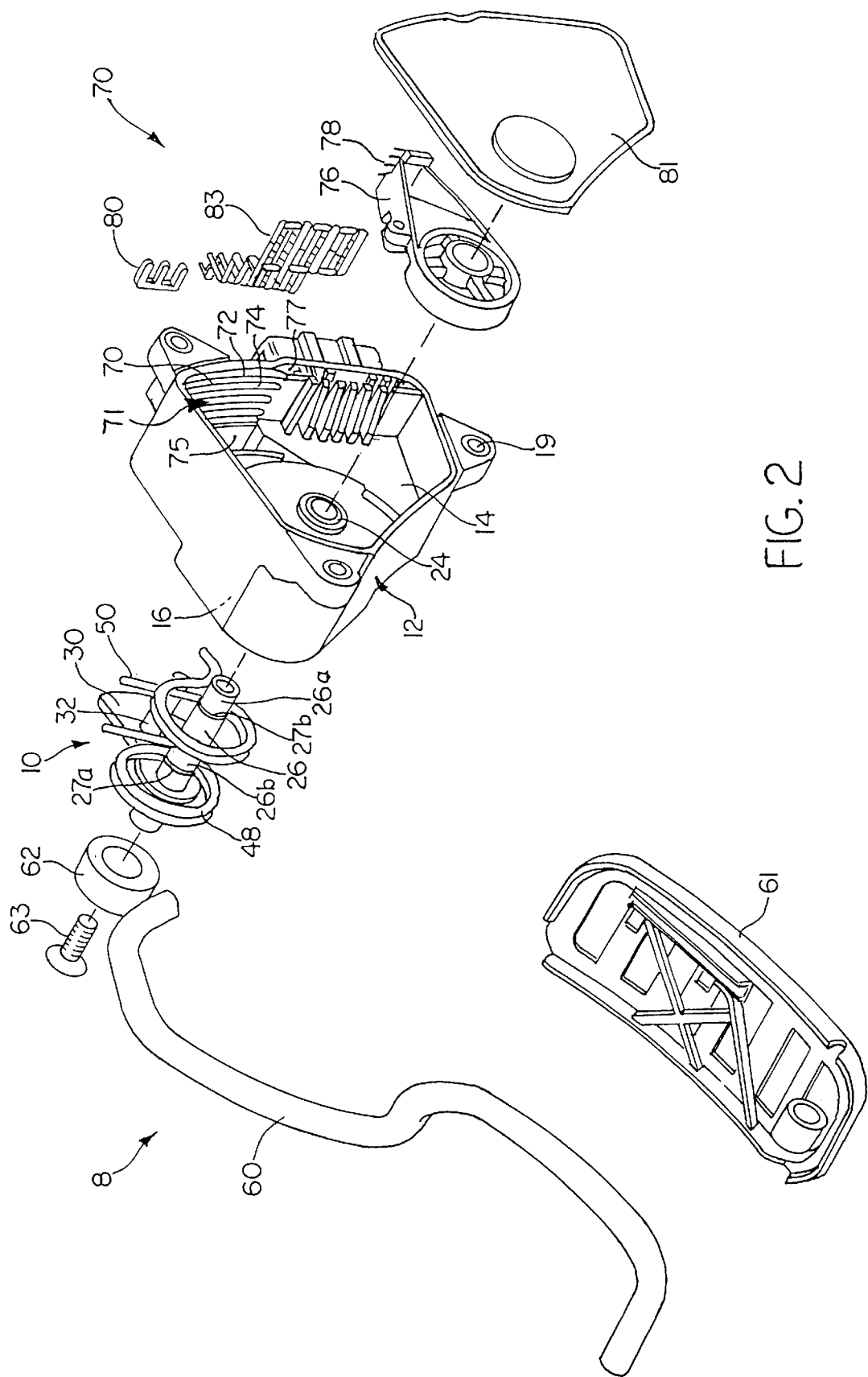
FIG. 2 is an exploded perspective view of the sensor side of FIG. 1.
Figure 3:
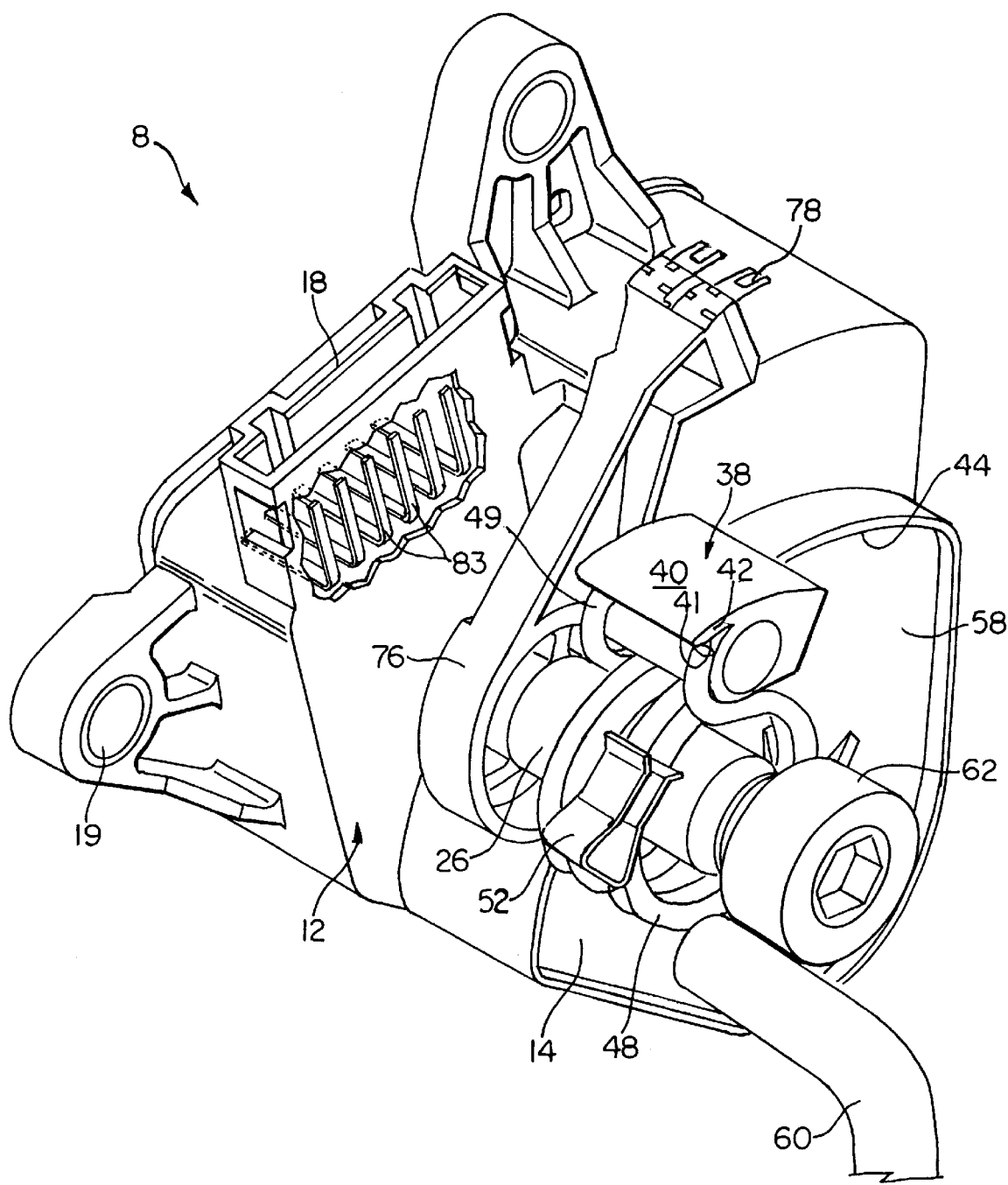
FIG. 3 is an assembled fragmentary view of a FIG. 1 with the drive plate removed.
Figure 4:
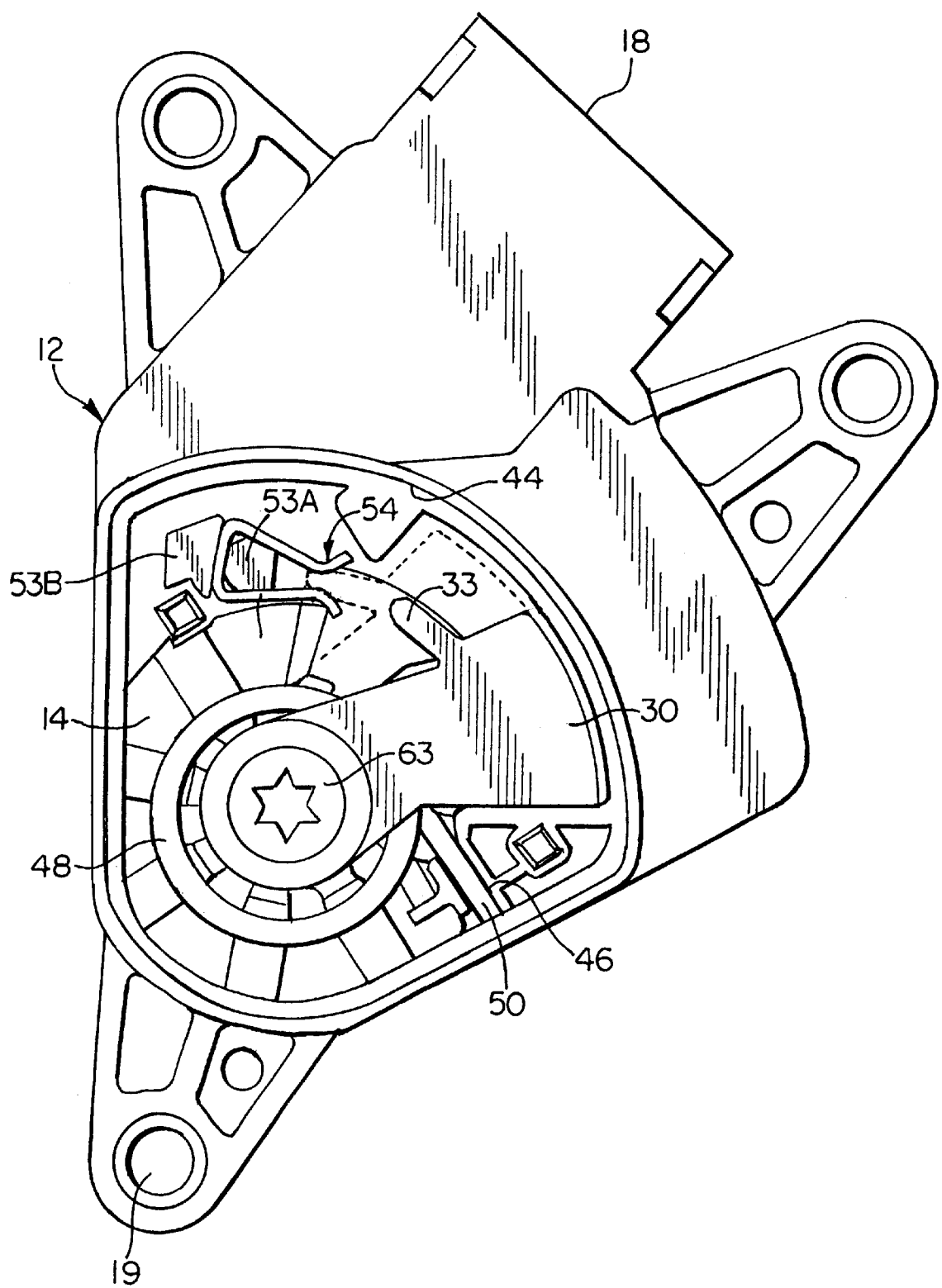
FIG. 4 is a side view of FIG. 3 looking into the spring cavity with the cover removed.

Referring to FIGS. 1–4, there is an accelerator pedal assembly 8 shown. Pedal assembly 8 has a housing 12 with a sensor cavity 14 on one side and a spring cavity 16 on another side. Pedal assembly 8 has a spring assembly 10 contained within cavity 16. A connector shroud 18 extends away from housing 12. Connector shroud 18 is used to connect a wire harness (not shown) to the pedal assembly. Three mounting holes 19 are arranged around the periphery of housing 12. Mounting holes 19 are used to attach the pedal assembly 10 to an inner structural member of a vehicle such as a firewall (not shown) or a bracket attached to a firewall. Fasteners (not shown) such as bolts or rivets would pass through holes 19 to attach assembly 10 to the firewall. Housing 12 would typically be molded from plastic. A shaft hole 20 passes through housing 12. Ribs 22 are arranged around shaft hole 20 to provide structural strength. A pair of conventional bearings 24 are mounted inside hole 20 to rotatably support the moving parts of the pedal assembly.

Spring assembly 10 has a steel shaft 26 is mounted in shaft hole 20. Shaft 26 has two ends a spring end 26A and a sensor end 26B. Two 0-rings are mounted on shaft 26, sensor O-ring 27A and spring O-ring 27B. A planar steel drive plate 30 is attached to shaft 26. Drive plate 30 has an aperture 31 through which shaft 26 passes. Drive plate 30 has a rod 32 extending perpendicularly away from plate 30 and a nose 33.

A molded plastic friction plate 38 has an oval shaped hole 39 extending therein, an outer surface 40, a shoulder 41 and a lip 42 located between shoulder 41 and outer surface 40. Rod 32 extends into bore 39 and provides rotational support allowing plate 38 to at least partially rotate on rod 32. Outer surface 40 is in frictional contact with wall 44 of housing 12. A torsion spring 48 is located around shaft 26. Spring 48 has a pair of curved spring ends 49 that rest upon shoulder 41. Spring 48 also has a pair of straight spring ends 50 that are fixedly held by slot 46 in spring cavity 16. The oval shaped hole 39 allows the spring 48 to press the friction plate outwardly toward wall 44.

A pair of posts 53A and 53B extend into cavity 16 from housing 12. A spring steel kickdown clip 52 is pressed over and held by posts 53A and 53B. A kickdown assembly 54 is made up of clip 52, and nose 33 of drive plate 30. Nose 33 is pressed into clip 52 as shaft 26 rotates. When nose 33 engages clip 52, it causes the pedal operator to feel more resistance. Nose 33 and plate 30 are shown in dotted line engagement with clip 52 in FIG. 4. A plastic spring cover 58 is ultrasonically welded to housing 12 to seal cavity 16. Spring cover 58 has an aperture 59 through which shaft 26 passes. Steel pedal bar 60 has a rubber footpad 61 attached at one end and a ring 62 welded to the other end. Ring 62 has an inner tapered surface that mates with shaft end 26A which is also tapered. A screw 63 attaches ring 62 to shaft 26.

A sensor assembly 70 is contained within sensor cavity 14. Sensor assembly 70 has a Kapton flexible film 71 that has resistor tracks 72 and conductor tracks 74. Film 71 is located in sensor cavity 14 and rests against wall 75. One end of film 71 is located in slot 77. Terminals 83 are insert molded into housing 12. The terminals 83 would be connected with the wire harness. A metal pressure wedge 80 is pressure fit into slot 77 to make electrical connections between conductors tracks 74 and terminals 83. A rotor 76 is pressure fit over shaft 26. Rotor 76 has contactors or wipers 78 attached to one end of the rotor. A sensor cover 81 is ultrasonically welded to housing 12 to seal sensor cavity 14. In operation rotor 76 moves as shaft 26 does, this causes the contactors 78 to move along resistor tracks 72 and conductors tracks 74. As the contactors 78 move, a voltage applied to the terminals will change magnitude. This is called an electrical output signal and is indicative of the shaft position. Additional details on the operation and construction of sensor assembly 70 are detailed in U.S. Pat. No. 5,416,295 the contents of which are specifically herein incorporated by reference in their entirety.

Remarks About the Preferred Embodiment

When a vehicle operator presses on footpad 61, pedal bar 60 causes shaft 26 to rotate. As shaft 26 rotates, rotor 76 turns which causes the wipers 78 to move along the resistor tracks 72 and conductor tracks 74 which causes the electrical output signal to change as a function of the pedal position. At the same time that shaft 26 is rotating, drive plate 30 is rotated. When drive plate 30 rotates, friction plate 38 is forced against wall 44 in rubbing contact causing a resistive feedback to the pedal operator. At the same time that the friction plate 38 is being engaged, the torsional spring 48 is being loaded or wound by being in contact with the moving friction plate 38. As the shaft 26 rotates further, spring 48 is loaded more. When the pedal bar 60 is near a point of maximum depression, nose 33 on drive plate 30 engages kickdown clip 52 that is mounted to post 53. The kickdown clip provides a tactile feedback to the pedal operator that the pedal is at a maximum point of depression. The maximum point of pedal depression can correspond to a wide open engine throttle position or can be used to indicate a downshift point for an automatic transmission. When the pedal operator lifts his foot from footpad 61, the loaded torsion spring 48 causes friction plate 38, drive arm 30, shaft 26 and pedal bar 60 to return to their original starting position. This position corresponds to an idle engine throttle position.

The harness connected to the terminals 83 typically connects with an engine control computer. The engine control computer controls an electric motor attached to a throttle plate mounted on the intake of the engine. In this manner, the pedal assembly 8 is able to control the throttle setting on the engine electronically or through a wire. Systems of this type are called drive by wire systems.

Variations of the Preferred Embodiment

Although the illustrated embodiment used a kickdown clip and a friction plate, if desired they could be omitted.

The pedal assembly shown used a torsion spring, one skilled in the art will realize that the preferred embodiment would work with other types of springs. For example, leaf springs and coil springs could be used.

Although the pedal assembly was shown with a single kickdown clip, it is contemplated to provide more than one kickdown clip if additional tactile feedback points are desired.

Another variation of the pedal assembly would be to utilize other electrical connections. For example, other types of connectors or terminals could be used in place of a wire harness.

Yet, a further variation, would be to place signal conditioning circuitry inside housing 12 to amplify and filter the electrical signal before it is transmitted.

The illustrated embodiment showed the use of the pedal assembly in a motor vehicle. It is contemplated to utilize the pedal assembly in other applications such as boats, airplanes, trains, machinery and games.

While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic accelerator pedal mechanism for a vehicle, comprising:
    a) a housing having a sensor cavity and a spring cavity separated by a wall;
    b) a shaft extending through the wall and the spring and sensor cavities;
    c) a pedal bar attached to a first end of the shaft, the shaft rotating as an operator applies a force on the pedal bar;
    d) a drive plate located in the spring cavity and attached to the shaft, the drive plate having a rod extending from the drive plate parallel to the shaft toward the sensor cavity and the drive plate having a nose;
    e) a friction plate mounted over the rod and in contact with the housing, the friction plate engaging in frictional contact with the housing as the shaft rotates, the friction plate providing a resistance against the force applied by the operator on the pedal bar;
    f) a bifurcated kickdown clip, mounted to the wall in the spring cavity, the nose engaging and spreading the clip as the pedal is depressed providing an increased resistance;
    g) a spring disposed around the shaft, for biasing the pedal bar to an original position after the operator removes the force applied to the pedal bar; and
    h) a sensor located in the sensor cavity and attached to a second end of the shaft, the sensor generating an electrical signal in response to the rotation of the shaft, the electrical signal changing as a function of the position of the pedal bar, the sensor including a rotor attached to the second end of the shaft, a contactor attached to the rotor, the contactor extending parallel to the rotor and a film mounted inside the sensor cavity to a second wall, the film having a plurality of resistive tracks disposed thereon, the contactor contacting the resistive tracks as the rotor rotates.

2. An electronic accelerator pedal mechanism for a vehicle, the pedal being depressed by an operator, comprising:
    a) a housing having a sensor cavity and a spring cavity separated by a wall;
    b) a shaft having a first and a second end, the shaft extending through the spring cavity, the wall and into the sensor cavity, the second end located in the sensor cavity, the first end extending outside the spring cavity;
    c) a pedal bar attached to the first end of the shaft, the shaft rotating as the operator depresses the pedal bar;
    d) the spring cavity containing therein:
        d1) a drive plate attached to the shaft, the drive plate having a rod extending from the drive plate, parallel to the shaft, and a nose;
        d2) a friction plate mounted over the rod and in contact with the housing, the friction plate engaging in frictional contact with the housing as the shaft rotates, the friction plate providing a first resistive force as the pedal is depressed to a first position;
        d3) a bifurcated kickdown clip, mounted to the wall, the nose of the friction plate engaging the clip as the pedal is depressed and providing an a second resistive force as the pedal is depressed to a second position;

d4) a spring mounted around the shaft, the spring biasing the pedal bar to a rest position; and e) the sensor cavity containing therein:

e1) a sensor attached to the second end of the shaft, the sensor generating an electrical signal in response to the rotation of the shaft, the electrical signal changing as a function of the position of the pedal bar, the sensor having a resistive film mounted to an inner circumferential surface of the sensor cavity.

3. The electronic pedal mechanism according to claim 2, wherein the sensor further comprises:

a) a rotor attached to the second end of the shaft;

b) a contactor attached to the rotor; and c) the film having a plurality of resistive tracks disposed thereon, the contactor contacting the resistive tracks.

4. The electronic pedal mechanism according to claim 2, wherein a first cover covers the spring cavity and a second cover covers the sensor cavity.

5. The electronic pedal mechanism according to claim 4, wherein the first end of the shaft extends through an aperture in the first cover, the pedal bar mounted outside the housing adjacent the first cover, the pedal bar connected to the first end of the shaft.

* * * * *